United States Patent [19]

Schoneberger, Jr.

[11] 4,283,943
[45] Aug. 18, 1981

[54] METHOD AND APPARATUS FOR INDICATING AND ADJUSTING THE ANGULAR POSITION OF A SAIL

[76] Inventor: George H. Schoneberger, Jr., 3710 N. 7th St., Phoenix, Ariz. 85014

[21] Appl. No.: 39,881

[22] Filed: May 18, 1979

Related U.S. Application Data

[63] Continuation-in-part of Ser. No. 974,077, Dec. 28, 1978, abandoned.

[51] Int. Cl.³ .............................................. G01W 1/00
[52] U.S. Cl. .................................. 73/188; 73/178 R; 114/102; 116/26; 116/DIG. 7
[58] Field of Search ................ 114/39, 102, 103, 270, 114/144 R, 144 C; 116/26, 27, 35 R, 200, 265, DIG. 7; 73/178 R, 180, 186, 187, 188, 189; 318/588

[56] References Cited

U.S. PATENT DOCUMENTS

| | | | |
|---|---|---|---|
| 3,049,008 | 8/1962 | Polster | 73/188 |
| 3,371,529 | 3/1968 | Tillman | 73/188 |
| 3,654,807 | 4/1972 | Deskey | 73/189 X |
| 3,789,793 | 2/1974 | Keim | 73/188 X |
| 3,845,734 | 11/1974 | Demos | 116/200 |
| 4,027,533 | 6/1977 | Pretto | 73/180 X |
| 4,080,826 | 3/1978 | Perretta | 116/200 |

Primary Examiner—George E. A. Halvosa
Attorney, Agent, or Firm—Drummond and Nelson

[57] ABSTRACT

Apparatus and method for indicating and adjusting the angle between the horizontal tangent to the luff of a sail and the direction of the apparent wind.

2 Claims, 21 Drawing Figures

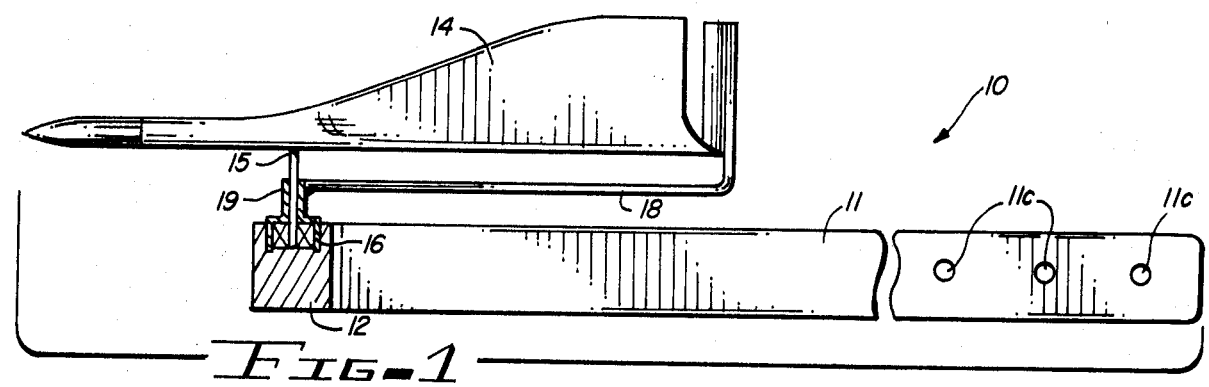
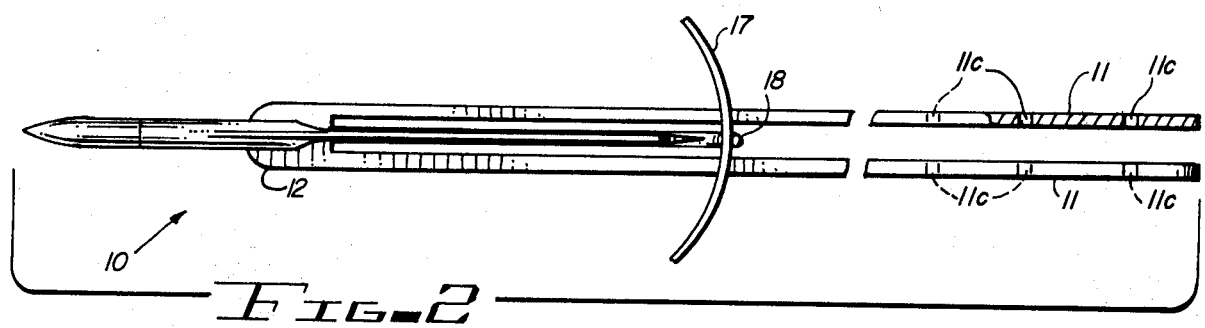
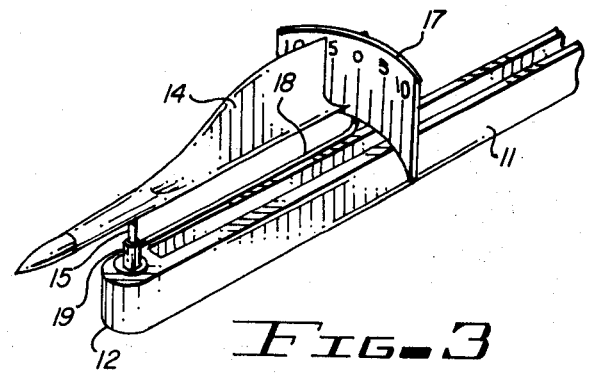
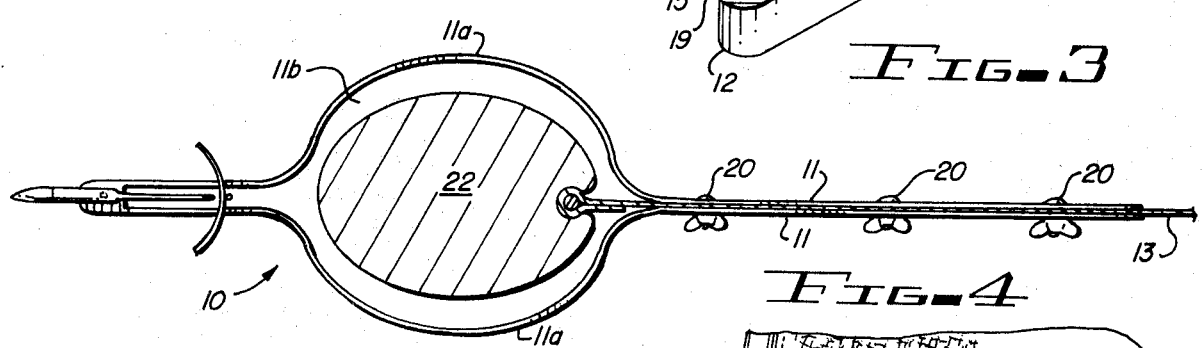
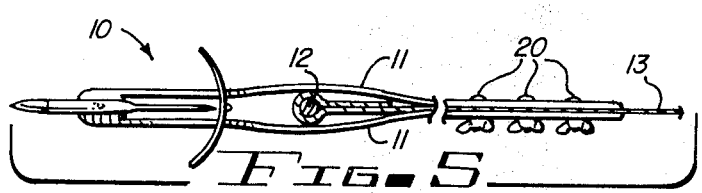
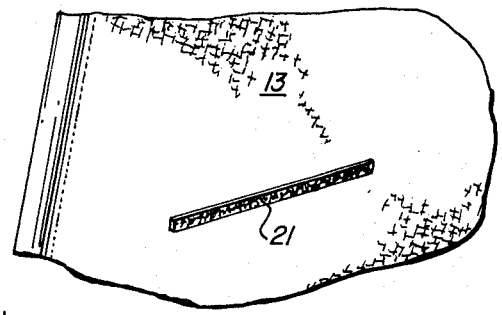

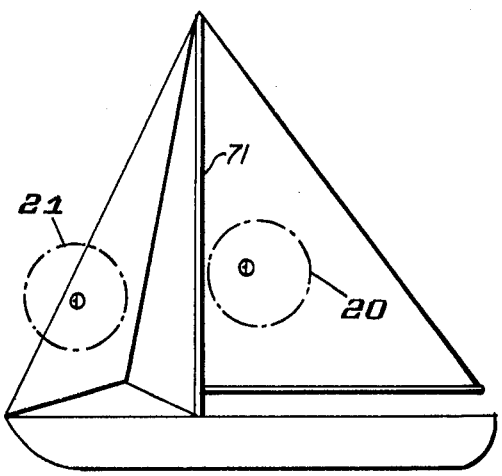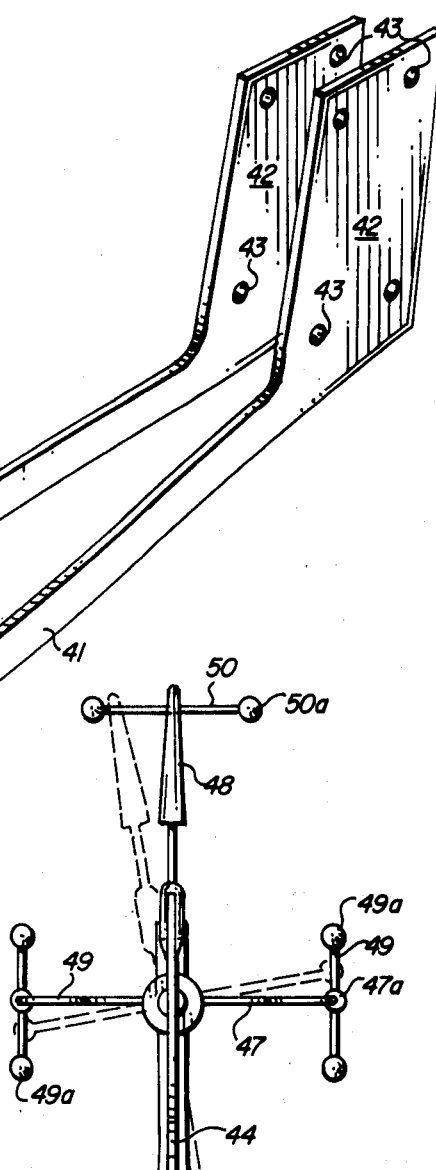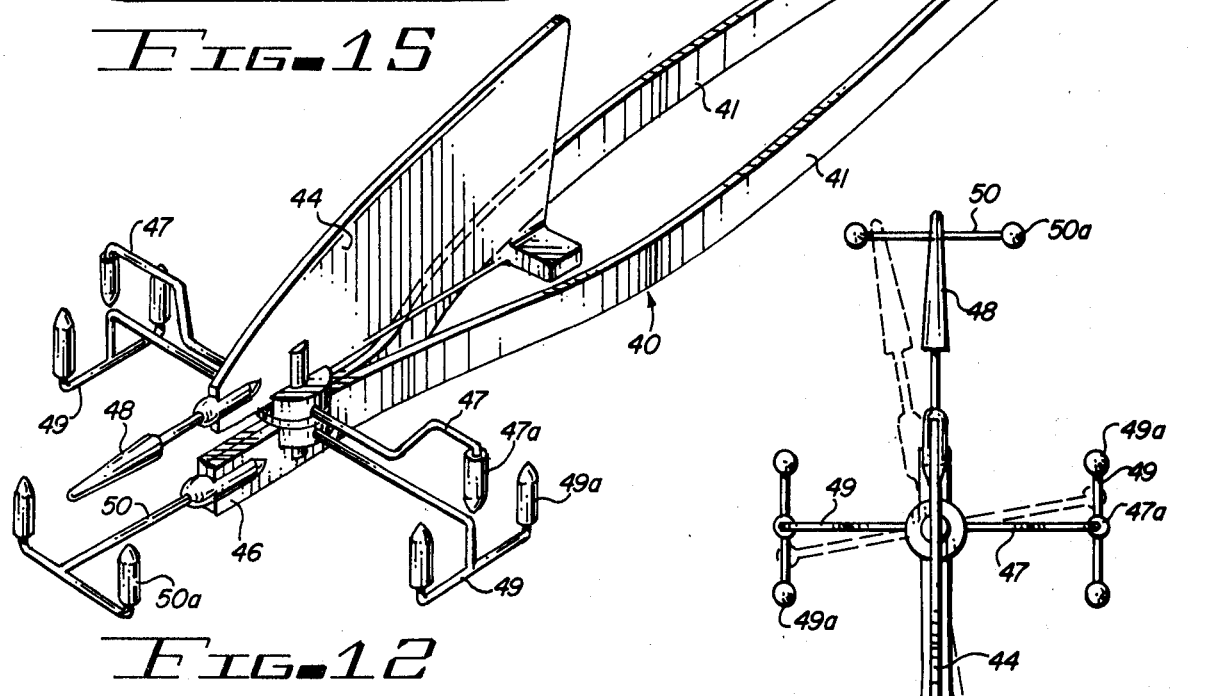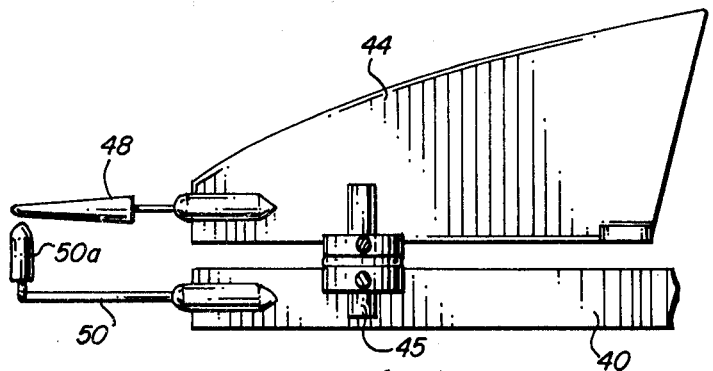

METHOD AND APPARATUS FOR INDICATING AND ADJUSTING THE ANGULAR POSITION OF A SAIL

CROSS REFERENCE TO RELATED INVENTION

This application comprises a continuation-in-part of my U.S. application Ser. No. 974,077 for "Method and Apparatus for Indicating and Adjusting the Angular Position of a Sail," filed Dec. 28, 1978 and now abandoned.

BACKGROUND OF THE INVENTION

This invention relates to improvements in apparatus and methods for operating sailboats.

In one aspect, the invention concerns apparatus for measuring the horizontal angle between the tangent to the luff of the sail and the direction of the apparent wind.

In another respect, the invention concerns a method for adjusting the angular position of a sail to provide maximum pulling power.

On a close-hauled or reaching course, the sails of a sailboat operate as vertical airfoils to produce motive force to move the boat through the water. As the sail moves through the apparent wind, the increased velocity of flow of air on the lee or convex side of the sail causes the formation of a low-pressure field on the lee side of the sail. This low-pressure area is not only the source of the negative or suction power acting on the sail, it also sets up an important aerodynamic chain reaction which leads to the forming of an even greater pressure differentiation between the lee and windward sides of the sail. As the leading edge (luff) of the sail approaches "new" air, the air mass must be split and, when it does, more of this air mass is attracted to the low-pressure area on the lee side of the sail. Thus, an even greater mass of air must travel faster around the lee side of the sail which results in an even greater decrease in pressure which, in turn, attracts even more of the air mass. This chain reaction continues to build until maximum flow velocity for the existing wind condition is reached, and a maximum low-pressure area is created on the lee side of the sail.

Since the length of the path by which the air must move past the sail varies with the angle of attack of the sail to the apparent wind, it is obvious and well known in the art that adjustments in the angular position of the sail would increase or decrease the motive power produced by the sail. The increase or decrease in the speed of the boat in response to large changes in the angular position of sails is easily noticed, even by the novice sailor. However, where even very minute changes in boat speed, not otherwise noticeable, are important as in sailboat racing, it is very difficult, even for the most experienced sailor, to precisely adjust the angular position of the sail to achieve maximum "pulling" power.

In the past, several devices have been provided to assist the sailor in finding and maintaining the optimum angle of attack for his sails. Crude devices such as pieces of string or cloth have been attached to the standing rigging of the boat as a means for visually indicating the direction of the apparent wind. Similarly, wind vanes have been attached at various points on the boat such as at the mast head, on the spreaders, on the deck, or on the mast itself. All of these devices serve to provide a visual indication of the angle of the apparent wind to the center line of the boat. To utilize such devices, the sailor must first determine the angle between the apparent wind and the center line of the boat by observing the telltale or the wind vane and must then make a second correlation between the center line of the boat and the angular position of the sail. While these correlations become almost instinctive, they do require both time and relatively unrestricted visibility of the apparent wind direction indicating device. Under some sailing conditions and especially under racing conditions, the sailor has only very limited time and in some cases restricted visibility and, consequently, he is unable to always maintain the angle of attack of his sails at the optimum angle for maximum pulling power, especially in shifting winds or with changes in boat speed, both of which cause changes in the angle of the apparent wind.

It would therefore be highly desirable to provide a device of simplified construction and operation which can be quickly and conveniently placed in direct line of observation by the helmsman and which gives a direct indication of the angle of attack of the sail.

It would also be highly advantageous to provide a method for adjusting the angular position of the sail by using the direct indication provided to adjust the sail angle to produce maximum pulling power.

Accordingly, it is the principal object of the present invention to provide improved apparatus for indicating the angle of attack of a sail.

Another principal object of the invention is to provide a method of adjusting the angular position of the sail to produce the maximum pulling power.

These and other, further and more specific objects and advantages of the invention will be apparent to those skilled in the art from the following detailed description thereof, taken in conjunction with the drawings, in which:

BRIEF DESCRIPTION OF THE DRAWINGS

FIG. 1 is a partial sectional elevation view of one form of apparatus embodying the present invention specially adapted for trimming headsails;

FIG. 2 is a top view of the apparatus of FIG. 1;

FIG. 3 is a perspective view of the apparatus of FIGS. 1-2;

FIG. 4 is a sectional plan view of a device embodying one aspect of the invention, specially adapted for use in trimming a mainsail or a mizzen sail;

FIG. 5 is a sectional plan view showing the attachment of the devices of FIGS. 1-3 to a headsail around the forestay;

FIG. 6 is a perspective view showing an alternate mode of attachment of the device of FIGS. 1-3 to a headsail;

FIG. 12 is a perspective view of the preferred embodiment of the invention which provides additional means for visually correlating the angle of the apparent wind-indicating vane with the angular position of the sail;

FIG. 13 is a top view of the embodiment of FIG. 12;

FIG. 14 is a side view of the forward portion of the device of FIG. 12;

FIG. 15 is a side view of a sailboat utilizing an alternate embodiment of the invention in which the device for correlating the angle of the apparent wind with the angle of the sails is mounted in the sail itself rather than forward of the leading edges of the sail;

SUMMARY OF THE INVENTION

Figure 8:
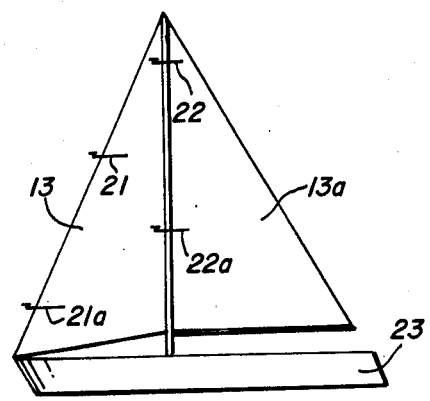
FIG. 8 depicts the devices of FIGS. 1-4, affixed in accordance with the invention to the luff of the mainsail and the headsail of a sloop-rigged boat.

Briefly, in accordance with the invention, I provide apparatus and methods for indicating and adjusting the angular position of a sail.

The apparatus comprises wind vane means for directly indicating the horizontal angle between the tangent to the luff of the sail and the direction of the apparent wind. The presently preferred embodiment comprises a bracket carried by the effective luff of the sail and a wind vane responsive to the direction of the apparent wind, pivotally mounted on said bracket. An alternate embodiment comprises an elongate bracket member having a forward end and a rear end, means for attaching the rear end of the bracket to the leading edge portion of the sail, with the forward end of the bracket extending horizontally forwardly of the luff and a wind vane pivotally mounted horizontally on the forward end of the bracket.

According to the method of the invention, the angular position of the sail is adjusted to produce the maximum pulling power by measuring the horizontal angle between the tangent to the luff of the sail and the direction of the apparent wind and adjusting this angle to 0° within the tolerance of the adjustment.

DETAILED DESCRIPTION OF PREFERRED EMBODIMENTS

Turning now to the drawings, which are provided for the purpose of illustrating the practice of the invention and which do not constitute limitations on the scope thereof, FIGS. 1-3 illustrate one embodiment of the invention as incorporated in a device for use in connection with a headsail such as a jib, genoa or other sail which is supported at its luff by a stay such as the forestay of a sloop-rigged boat. The device consists of a bracket, generally indicated by the reference character 10, consisting of a pair of elongate parallel flexible plates 11 joined at their forward ends 12 and provided with a series of spaced holes 11C. A wind vane 14 is pivotally mounted by means of an integrally formed post 15 in a bearing assembly 16 located on the forward end 12 of the bracket 10. Preferably, the assembly also includes an angular position indicator consisting of a transparent scale 17, mounted vertically on a rod 18 which extends forwardly to and is affixed to the bearing casing 19 mounted in the forward end 12 of the bracket 10. The scale 17 may be graduated in degrees as shown or any other convenient reference indicia.

The apparatus of FIGS. 1-3 is attached to the headsail as shown in FIG. 5 or by any other suitable technique, for example, as shown in FIG. 6. Referring to FIG. 5, the elongate flexible plates 11 of the bracket 10 are passed around the forestay 12 which supports the luff of the sail 13 and the rear ends of the bracket 10 are secured by means of fasteners 20 which extend through grommets formed in the leading edge portion of the sail 13. The fasteners 20 should be bolts provided with wing nuts as shown in FIG. 5 or any other suitable detachable fastener to facilitate mounting or demounting the device from the sail as the device must be attached to the sail after it is bent onto the forestay and must be removed from the sail when the sail is handed and stowed. Alternatively, the rearwardly extending flexible plates 11 of the bracket 10 may be provided on their inner surfaces with portions of a fastener such as Velcro (Registered Trademark) strip which registered with and secured the device to other mating portions 21 of a Velcro fastener sewn on either side of the leading edge portion of the sail, as shown in FIG. 6.

A device for use in indicating the angular horizontal angle between the apparent wind and the tangent to the luff of a mainsail or mizzen sail is illustrated in FIG. 4. The wind vane 14 is pivotally mounted on the forward end 12 of a bracket comprised of rearwardly extending plates 11 which have outwardly curved portions 11A to provide a sufficient clearance 11B between the bracket 10 and the mast 22 such that the entire assembly rotates free around the mast 22 when the angular position of the sail 13 changes. Again, as when the device is mounted with a headsail as shown in FIG. 5, the device of FIG. 4 is detachably affixed to and supported by the leading edge portion of the sail 13 by means of detachable fasteners 20.

Either the bracket 10 of FIGS. 1-3 or the bracket 10 of FIG. 4 may include a gimbal to maintain the vane 14 horizontal at varying angles of keel, to further improve the accuracy of the device.

The devices of FIGS. 1-6 may be mounted at one or a plurality of points along the luff of a sail as illustrated in FIG. 8 which shows two of the devices 21 and 21A mounted at spaced locations along the luff of a headsail 13 and two of the devices 22 and 22A mounted on the luff of the mainsail 13A of a sloop-rigged boat. The devices are preferably mounted at spaced locations along the luffs of the various sails as the apparent wind may and usually does vary with the vertical distance above the waterline 23. In this fashion, the sailor, by adjusting the shape of the sail by various well known techniques, can adjust the angle of attack of the sail properly along substantially the entire length of its luff.

Figure 9:
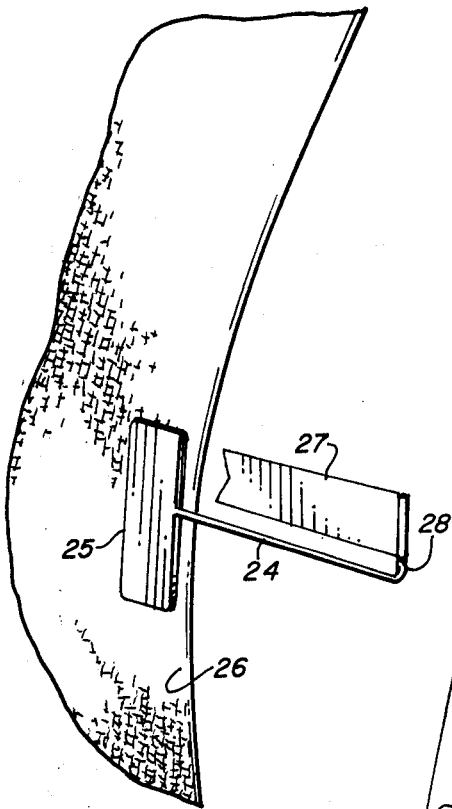
FIG. 9 depicts a device constructed in accordance with the principles of the present invention, attached to the leading edge of a spinnaker.

FIG. 9 illustrates an embodiment of the invention which is useful for indicating the angle of attack of a sail such as a spinnaker or kroon which is not supported at its leading edge by a stay or a mast or the angle of attack of a headsail handed to a forestay or small headfoil. The wind vane bracket consists of a rod 24 formed integrally with a plate 25 which can be attached to the leading edge portion 26 of the sail by any suitable technique such as Velcro fasteners, etc. The rod 24 may be curved to clear a forestay or headfoil.

The rod 24 is provided with a flexible tape 27 which acts as a wind vane by bending or rotation around the upturned forward end of the rod 24.

Figure 10:
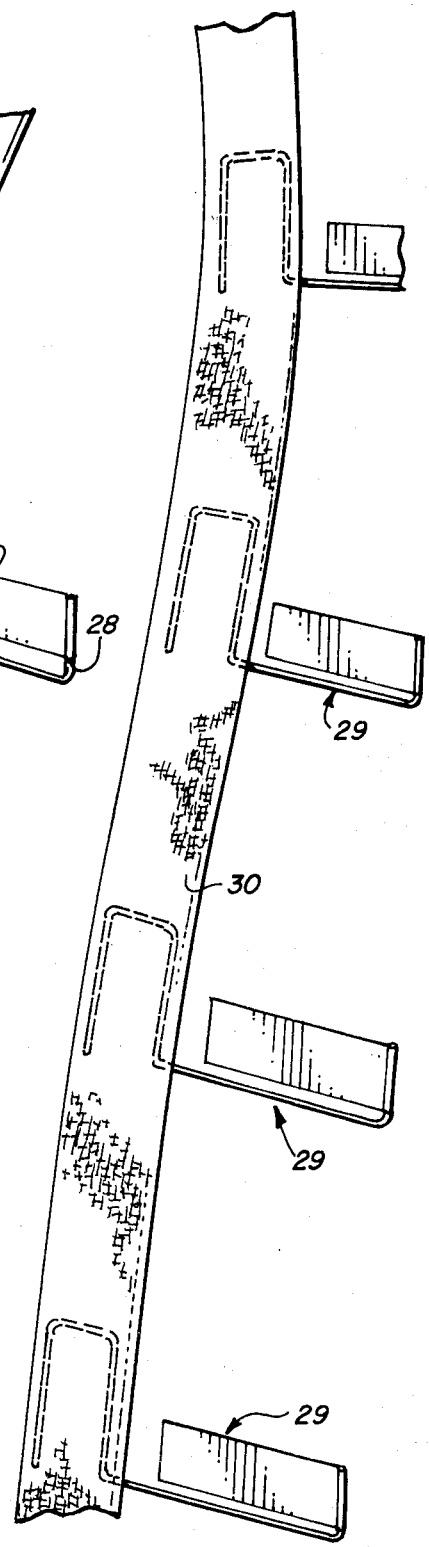
FIG. 10 depicts a plurality of devices of the type depicted in FIG. 9 affixed to a tape which can be sewn to the leading edge of a spinnaker.

Alternatively, as shown in FIG. 10, a plurality of such devices 29 may be attached by sewing or any other suitable method to a tape 30 which can be attached by sewing, Velcro fasteners, etc. to the leading unsupported edge of the sail.

Figure 11:
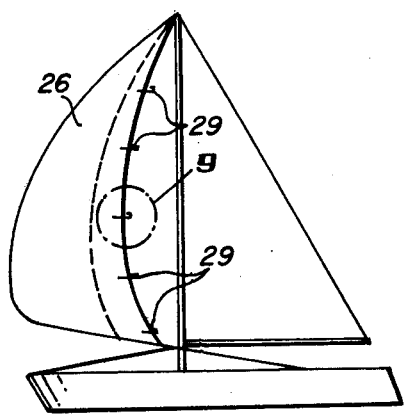
FIG. 11 illustrates a plurality of the devices of FIG. 9 attached to the leading edge of a spinnaker set on a sloop-rigged boat.

As shown in FIG. 11, a plurality of the devices 29 are attached at spaced points along the leading unsupported edge of a sail such as a spinnaker 26 to provide visual indication of the horizontal angle between tangent to the leading edge of the sail 26 and the apparent wind, thus allowing the sailor to adjust the shape of the sail to provide optimum angle of attack along substantially the entire leading edge of the sail.

Figure 7:
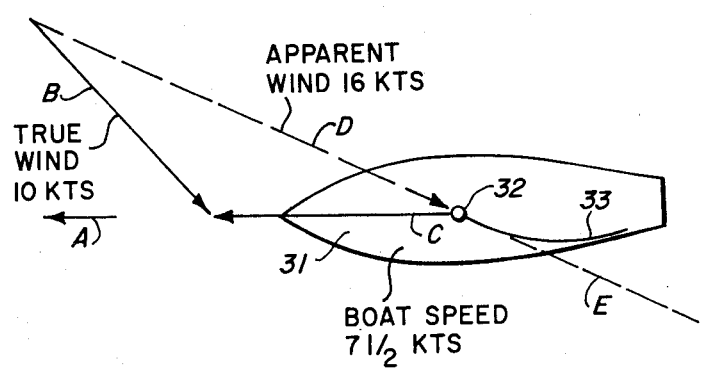
FIG. 7 is a vector diagram illustrating the mode of operation of apparatus embodying the present invention and the method of adjusting the angular position of a sail in accordance with the invention to provide maximum pulling force.

The operation of the apparatus and method of the present invention is illustrated by the vector diagram of FIG. 7 which illustrates a sailboat 31 having a single mast 32 and a single sail 33. The course of the boat is indicated by the arrow A. If it is assumed that the true wind is 10 knots from the direction indicated by the vector B and that the boat speed is 7½ knots as indicated by the vector C, then as is well understood by those in the art, the "apparent" wind will be at 16 knots and from the direction relative to the boat's course as indicated by the vector resultant D.

Although the lee side of the sail 33 is curved, it is effectively flat at and for an appreciable distance behind the luff and assumes the configuration of the horizontal tangent E to the sail at the luff. As the horizontal angle between the tangent E to the luff of the sail and the apparent wind D is adjusted to 0°, the angle of attack of the sail 33 will be optimized to produce maximum pulling power. Of course, the accurate adjustment of this horizontal angle must be made within the tolerance of measurement thereof and also within the tolerance of adjustment. The measurement of the angle will vary somewhat with the ability of the sailor to accurately correlate the angular position of the wind vane with the tangent to the luff. Adjustment of the angle between the apparent wind and the tangent to the luff can be effected by any of several well known techniques such as adjustment of the shape of the sail by means of outhauls, a Cunningham or a boom vane. Adjustment of the angle may also be effected by either easing or sheeting the sail and, of course, by manipulating the tiller to effect a course change. By any one or a combination of these techniques, the method of the invention is practiced by adjusting the horizontal angle between the tangent to the luff of the sail and the direction of the apparent wind to 0° within the tolerance of the adjustment and within the tolerance of the measurement of the angle.

The presently preferred embodiment of the invention is illustrated in FIGS. 12-13 and comprises a bracket generally indicated by reference character 40 which comprises a pair of rearwardly extending members 41 which terminate in plate portions 42 provided with registering holes 43 which receive rivets or other fasteners to mount the device on the forward luff portion of a sail. As shown, the rearwardly extending members 41 are curved to provide clearance around the luff support, a mast or other standing rigging (not shown).

Figure 16:
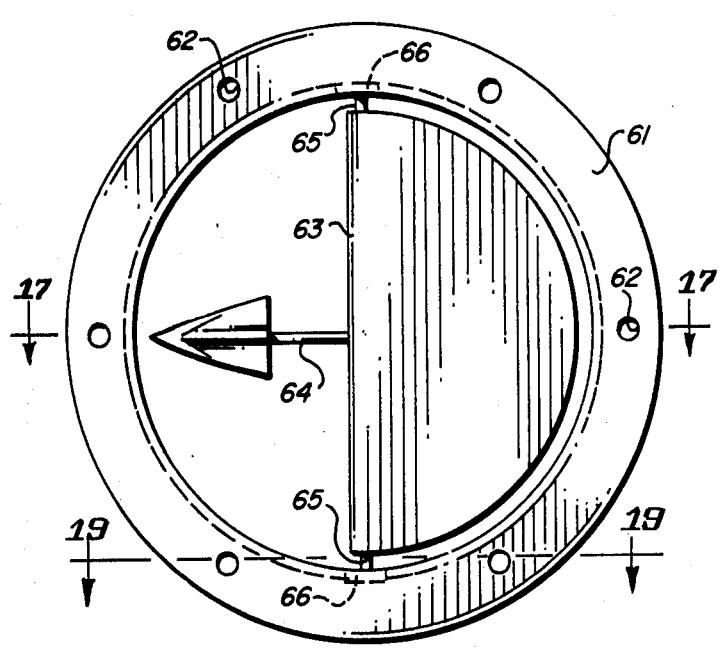
FIG. 16 is a side view of the alternate embodiment of the devices shown mounted in the forward edges of the sails as in FIG. 15.

A wind vane 44 is pivoted on an axis 45 received in the forward end portion 46 of the bracket 40. The vane 44 is provided with transverse pointer numbers 47 and a forward pointer 48. Indicator members 49 extend transversely from the bracket 40 and another indicator member 50 extends forwardly from the forward end 46 of the bracket 40. The indicator members 49 and 50 are provided with upstanding marker arms 49A and 50A at their terminal ends. In use, the helmsman need only maintain the downturned indicator ends 47A of the indicator arms 47 midway between the upturned indicator ends 49 of the reference arms 49 extending transversely from the forward end 46 of the bracket 40. Alternatively, the helmsman can maintain the pointer end 48 of the wind vane 44 between the upturned indicator ends 50A of the reference member 50 extending forwardly from the device. An alternate embodiment of the invention is illustrated in FIGS. 15-16. Referring specifically to FIG. 16, the device consists of a circular bracket member 61 provided with hole 62 to receive rivets or other fasteners for fastening the device directly to the effective luff of the sail. The term "effective luff" is intended to include that portion of the sail aft of the sail support which is far enough behind the sail support to be free of any wind shadow. A wind vane having a semi-circular tail portion 63 and a forwardly extending weighted pointer 64 is journaled for pivotal rotation around an axle 65 received in bearings 66 formed in the inner periphery of the circular bracket 61.

Figure 18:
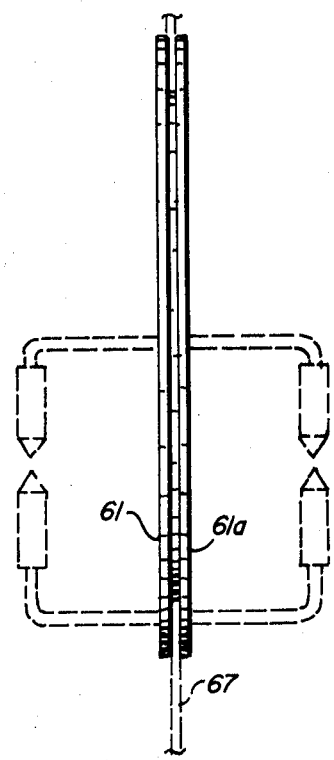
FIG. 18 is an end view of the device of FIGS. 16-17.
Figure 17:
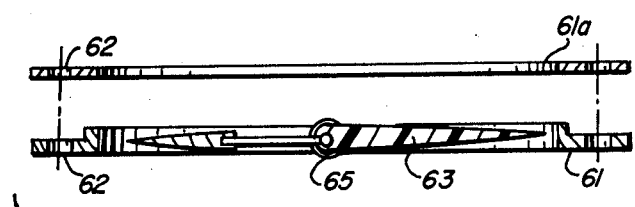
FIG. 17 is a sectional view of the device of FIG. 16 taken along section 17—17 thereof.
Figure 19:
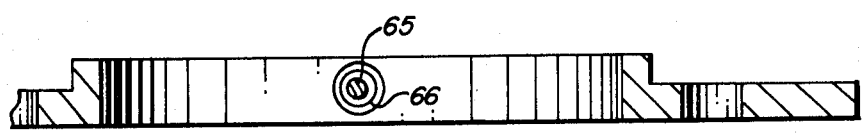
FIG. 19 is an enlarged sectional view of the device of FIG. 16 taken along section lines 19—19 thereof.
Figure 20:
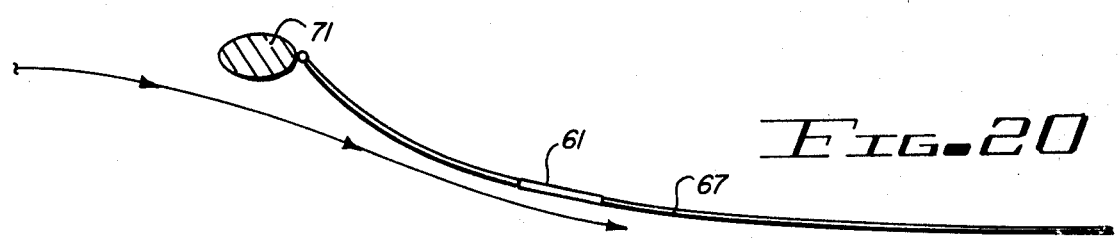
FIG. 20 is a schematic view showing the device of FIG. 16 mounted in a mainsail.
Figure 21:
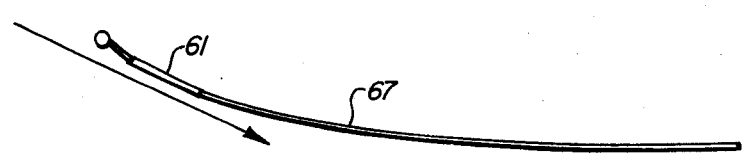
FIG. 21 is a schematic view showing the device of FIG. 16 mounted in a headsail.

As shown in FIGS. 17 and 18, the circular bracket 61 consists of two matching plate members 61 and 61A, each of which is positioned on the opposite side of the effective luff of the sail 67. The circular plates 61 and 61A are affixed to the sail by means of fasteners such as rivets or bolts with wing nuts inserted through the holes 62. After the device of FIG. 16 is affixed to the sail, the portion of the sail 67 within the inner periphery of the cylindrical brackets 61 is removed, thus allowing the vane 63 to rotate freely around the axle 65 journaled in the bearings 66 in the upper and lower portions of the cylindrical bracket 61. The placement of the device of FIGS. 16-19 will vary depending on the type of sail on which it is installed. As shown in FIGS. 20, 21, and 15, the device of FIG. 16 is installed on a mainsail or other sail which is supported by a mast 71 at a substantial distance behind the leading edge of the sail 67 so as to place the device at the effective luff of the sail, i.e., the forward portion of the sail which is free of any "wind shadow" effect caused by the mast 71. However, when the device of FIG. 16 is installed on headsails which are supported at their leading or luff edges by wire rigging or the like, the device is placed much closer to the forward edge of the sail 67 as this constitutes the effective luff of the sail since there is little or no wind shadow caused by the sail support.

If desired, instead of providing a mere visual indication of the angle of attack of the sail, electronic means can be provided to sense the direction of the apparent wind as indicated by the wind vane and the output of the sensor can be displayed at a remote indicating instrument or can drive an autopilot which automatically adjusts the sheeting angle of the sail and/or the sheeting tension, the tiller or the angle of an adjustable keel or centerboard which is sometimes used to minimize leeway.

As an ancillary benefit of the practice of the invention, the sailor can optimize the boat speed to account for other considerations than mere speed through the water. For example, when tactical considerations in racing or navigational consideration in cruising require that speed through the water be sacrificed to consideration of course made good, the helmsman can either head up or fall off by a given desired amount rather than simply guessing at the proper course to achieve these objectives. Thus, the deliberate adjustment of sail angle to a position other than that which will produce the maximum boat speed is also possible by the use of the apparatus and method of the invention and is comprehended by the scope thereof.

Having described my invention in such terms as to enable those skilled in the art to which it pertains to understand and practice it, and having described the presently preferred embodiments thereof, I claim:

1. Apparatus for directly indicating the horizontal angle between the tangent to the luff or effective luff of a sail and the direction of the apparent wind, comprising:
    (a) a bracket carried by the luff or effective luff of said sail;
    (b) a wind vane pivotally mounted on said bracket, which
        (i) is continuously responsive to the direction of the apparent wind at angles between and including the optimum angle for maximum sail pulling power and the angle at which said sail stalls, and
        (ii) directly indicates said horizontal angle.

2. Apparatus for directly indicating the horizontal angle between the tangent to the luff or effective luff of a sail and the direction of the apparent wind, comprising:
    (a) an elongate bracket member having a forward end and a rear end;
    (b) means for attaching the rear end of said bracket to the effective luff portion of sail with the forward end of said bracket extending horizontally forward of said luff; and
    (c) a wind vane pivotally mounted on the forward end of said bracket, which
        (i) is continuously responsive to the direction of the apparent wind at angles between and including the optimum angle for maximum sail pulling power and the angle at which said sail stalls, and
        (ii) directly indicates said horizontal angle.

* * * * *